INVENTOR:
A.I. Lehtinen

United States Patent Office 3,442,756
Patented May 6, 1969

3,442,756
METHOD FOR TESTING PULP SLURRY ON THE FORMING WIRE OF A PAPER MACHINE
Antti Ilmari Lehtinen, Jyvaskyla, Finland, assignor to Valmet OY, Helsinki, Finland, a corporation of Finland
Filed Oct. 5, 1965, Ser. No. 493,059
Claims priority, application Finland, Nov. 17, 1964, 2,411/64
Int. Cl. G01n 9/24; D21f 7/06, 1/08
U.S. Cl. 162—192      4 Claims

ABSTRACT OF THE DISCLOSURE

The thickness, consistency and homogeneity of pulp suspension in the forming wire in a paper machine are determined by a crystal producing ultrasonic energy and located under the forming wire, the water flowing through the wire from the pulp acting as an acoustical connector between the crystal and the pulp. Echoes detected by the crystal are used to indicate the values of the measured quantities.

---

It is known in prior art to test materials by means of ultrasonic energy. This is done, for instance, in that with the use of water or oil a crystal sending ultrasonic pulses is placed upon the surface of the object to be tested. During pulse intervals the same crystal performs as a receiver which detects the echoes reverberating from non-homogeneities and the opposite wall of the object.

By displaying the voltage from the crystal across the vertical scale on an oscilloscope screen with a suitable horizontal time-scale a cross-section picture of the object to be tested is obtained showing, for instance, possible pores and occlusions.

This invention has for its object to adapt ultrasonic examining means to the testing of paper web in a paper machine. Another object of the invention is to render possible the measurement of the thickness and the homogeneity of the paper web immediately after the pulp suspension has emerged from the head box into the forming wire. Never before in paper machines has the thickness of the pulp slurry been measured immediately after it has come on the wire, but it is obvious, that the time lag in automatic control can be reduced to a greater extent the earlier is the phase in which the measurement can be performed.

The invention according to this application resides in the discovery that ultrasonic energy is used for measuring the thickness, consistency and homogeneity of the flowing paper pulp suspension.

In accordance with the present invention an ultrasonic crystal is used, which is connected to an ultrasonic generator and is placed under the forming wire of a paper making machine so close to the wire that water flowing through the wire from the pulp acts as an acoustic connector between the ultrasonic crystal and the wire. The crystal emits vibratory pulses which produce returning pulses when they encounter the wire, an accumulation of fibrous matter, an air bubble suspended in the pulp and the surface of pulp suspension. These return pulses are received by the same ultrasonic crystal during the intervals between the emission of vibratory pulses. The return pulses are transmitted in a known manner to a recording device wherein the strength and position of the return pulses will indicate the size and position of the inhomogeneous matter in the pulp; the size of the pulses produced by the suspended matter in the pulp suspension course is indicative of the consistency of pulp suspension and the extent of uniformity of the returning pulses is indicative of the extent of homogeneity of the pulp suspension. The position of the return pulses produced by the wire and the surface of the pulp course will indicate the thickness of the pulp course.

By measuring the resulting echoes in the manner hereinabove described the respective thickness of the pulp suspension can be observed from the oscilloscope screen. Non-homogeneities in the suspension also raise an echo and become visible on the oscilloscope as a separate distinctive echo spire. In the same way the slurry normally in the web raises microscopic echoes which form a sort of undertone in the picture on the oscilloscope. Thus, from the intensity of this undertone it is possible to estimate the consistency of the pulp suspension. The thus obtained information can then be used for process control, either for manually effected basic control or for automatic control by connecting the apparatus for measuring the travelling time of the echo to the difference forming unit in the automatic control unit.

In the following description there is set forth in greater detail a preferred embodiment shown in the accompanying drawings.

FIG. 1 shows a forming wire 12 under which is arranged a quartz crystal 13 capable of sending and detecting ultrasonic energy pulses.

Figure 2:
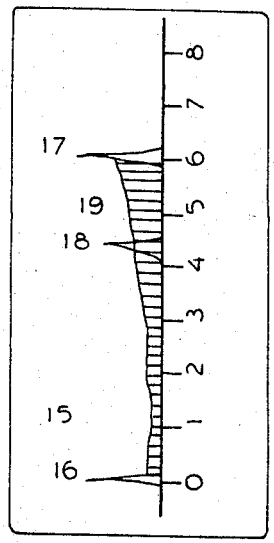

FIGURE 2 shows the echo formation visible on the oscilloscope 15 and having a starting spire 16, a top face echo spire 17, a stray pulse 18 caused by greater non-homogeneity 10 and the undertone 19 from microscopic echoes produced by the slurry.

The apparatus includes of course an ultrasonic pulse generator not shown.

The crystal 13 is located on a suitable rack underneath the wire for supporting the pulp suspension. It is not quite in contact with the wire since it would quickly wear out by being rubbed against the wire, but is located a little deeper so that it is not in direct mechanical contact with the wire. The rack supporting the crystal advantageously forms a raised rim around the crystal. As the pulp suspension emerges from the head box onto the forming wire it contains plenty of water which will run through the forming wire and away from the pulp as the pulp dries and thickens. This water running through the wire from the pulp suspension will, however, act as an acoustic connector between the crystal and the forming wire (or in other words, will act as a connector between the crystal and the pulp suspension). For obtaining good results from the ultrasonic examination it would in any case be necessary to use an acoustic connecting material.

Figure 1:
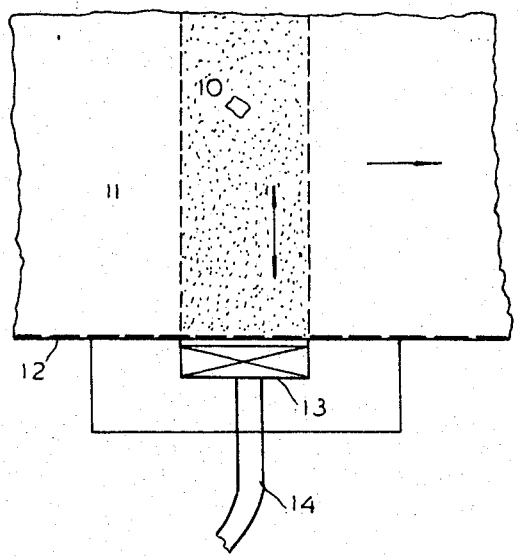
FIGURE 1 is a section of the pulp suspension and FIGURE 2 illustrates the echo formation.

When the ultrasonic crystal is in acoustic contact with the wire 12, ultrasonic pulses supplied by the ultrasonic generator to the ultrasonic crystal, will pass through the wire and into the pulp suspension course on the wire. These pulses will produce return pulses when they encounter the wire, any fibrous matter accumulations or air bubbles which may be present in the pulp and the surface of the pulp suspension course. The return pulses are received by the same crystal during intervals between vibratory pulses emitted by the crystal. The return pulses are transmitted by the cable 14 in a known manner to a suitable recording device. FIG. 2 shows the pattern produced on an oscilloscope screen by the returning pulses from an examining point indicated in FIG. 1. FIG. 2 shows that if there is accumulation of fibrous matter or a bubble 10 is the pulp course, their position will be also located. Furthermore, micropulses produced by the suspended matter indicate that the consistency of the pulp course gets greater toward the surface and that the pulp layer does not have uniform homogeneity.

Thus the present invention makes it possible to determine during operation the thickness, consistency and homogeneity of a pulp course on the wire. This is of great importance since it makes it possible to adjust pulp suspension so that it should have the desired consistency, homogeneity and thickness.

The sending unit for the ultrasonic energy and especially the method for measuring the echoes may naturally be modified in many different ways without departing from the spirit and scope of this invention as set forth in the appended claims.

I claim:

1. A method of examining the thickness, consistency and homogeneity of a pulp suspension course on the forming wire of a paper machine during operation of the machine, said method comprising placing an ultrasonic crystal under said wire and so close thereto that water flowing through the wire from the pulp serves as acoustic connector between the crystal and the wire, and energizing said crystal to cause it to emit vibratory pulses directed toward the wire, said vibratory pulses producing return pulses when encountering the wire, any accumulation of fibrous matter and air bubbles in the pulp suspension course and the surface of the pulp suspension course, said return pulses being received by said crystal during intervals between the vibratory pulses emitted by the crystal, and recording said return pulses, whereby the strength and position of the return pulses are indicative of the size and position of the inhomogeneous matter, while the size of pulses produced by the suspended matter in the pulp suspension course is indicative of the consistency of the pulp suspension and the uniformity of the return pulses is indicative of the extent of homogeneity of pulp suspension and while the position of the return pulses produced by the wire and by the surface of the pulp course is indicative of the thickness of the pulp course.

2. A method according to claim 1 wherein the voltage caused in the crystal by the returning echoes is made visible by connecting said voltage across the vertical scale in an oscilloscope with a horizontal time scale.

3. A method according to claim 2 wherein the horizontal scale is calibrated to show the thickness of the pulp suspension as the distance from the first echo to the last echo.

4. The method in accordance with claim 1, further comprising controlling the pulp suspension of the slurry by information supplied by the recorded return pulses in order to maintain constant the quality of pulp suspension.

References Cited

UNITED STATES PATENTS

| 2,280,226 | 4/1942 | Firestone | 73—67.8 |
| 2,527,208 | 10/1950 | Berry | 73—67.6 |
| 2,755,662 | 7/1956 | Swengel | 73—67.6 |
| 2,909,660 | 10/1959 | Alexander. | |
| 3,024,404 | 3/1962 | Ziffer | 162—198 X |
| 3,093,998 | 6/1963 | Albertson | 73—67.7 X |

HOWARD R. CAINE, *Primary Examiner.*

U.S. Cl. X.R.

73—67.8; 162—198